(12) United States Patent  (10) Patent No.: US 8,253,711 B2
Kim et al.  (45) Date of Patent: Aug. 28, 2012

(54) INPUT MODULE WITH CAPACITANCE SENSORS, METHOD FOR MANUFACTURING THE INPUT MODULE AND METHOD FOR CONSTRUCTING ALGORITHM FOR PROCESSING TOUCH INPUT APPLIED TO THE INPUT MODULE

(75) Inventors: Jong Ho Kim, Daejeon (KR); Yon-Kyu Park, Daejeon (KR); Min Seok Kim, Daejeon (KR); Dae Im Kang, Daejeon (KR); Jae-Hyuk Choi, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 898 days.

(21) Appl. No.: 12/353,765

(22) Filed: Jan. 14, 2009

(65) Prior Publication Data

US 2010/0123679 A1 May 20, 2010

(30) Foreign Application Priority Data

Nov. 14, 2008 (KR) ........................ 10-2008-0113108

(51) Int. Cl.
*G06F 3/045* (2006.01)
(52) U.S. Cl. ........................................ 345/174; 345/173
(58) Field of Classification Search .................. None
See application file for complete search history.

(56) References Cited

U.S. PATENT DOCUMENTS

| | | | |
|---|---|---|---|
| 2008/0012837 A1* | 1/2008 | Marriott et al. | 345/173 |
| 2008/0018611 A1* | 1/2008 | Serban et al. | 345/173 |
| 2008/0036745 A1* | 2/2008 | Betts-LaCroix et al. | 345/173 |
| 2008/0048992 A1* | 2/2008 | Sato | 345/173 |
| 2008/0158179 A1* | 7/2008 | Wilson | 345/173 |
| 2009/0073145 A1* | 3/2009 | Inoue et al. | 345/184 |

FOREIGN PATENT DOCUMENTS

KR 10-2004-0063142 A 7/2004

* cited by examiner

*Primary Examiner* — Lixi C Simpson
(74) *Attorney, Agent, or Firm* — Fenwick & West LLP

(57) ABSTRACT

Disclosed herein are a mouse with capacitance sensors, a method for manufacturing the mouse and a method for constructing an algorithm for processing an input corresponding to force applied by a user's finger to the mouse. The mouse with capacitance sensors includes a bottom plate having a center point, a plurality of electrodes formed at regular intervals on the top face of the bottom plate and arranged apart from the center point of the bottom plate by an equal distance, a top plate bonded to the top faces of the electrodes and deformed by force applied by a pointing object, and an adhesive layer formed around the top plate and the bottom plate to combine the top plate and the bottom plate. When the pointing object touches the top plate, capacitance sensors are formed between the pointing object and the electrodes to recognize a travel distance, a travel direction and a moving speed of a cursor through the magnitude and direction of force applied by the pointing object.

9 Claims, 15 Drawing Sheets

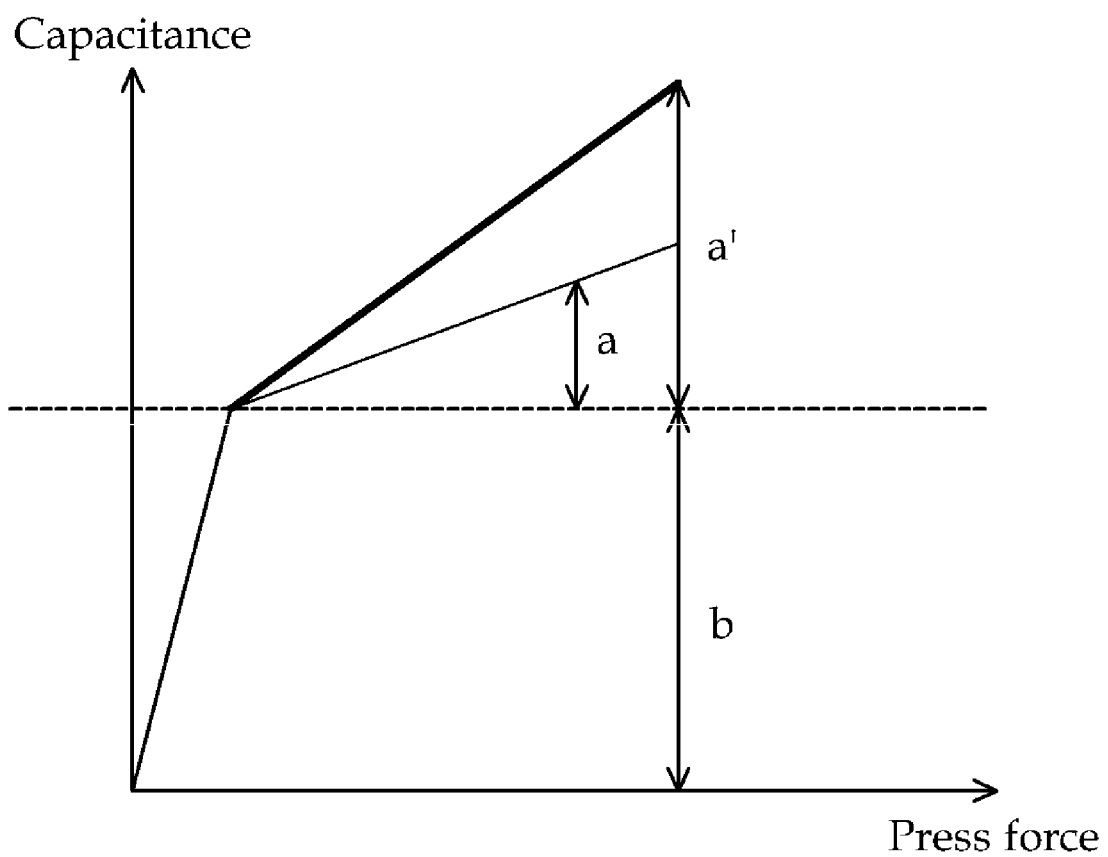

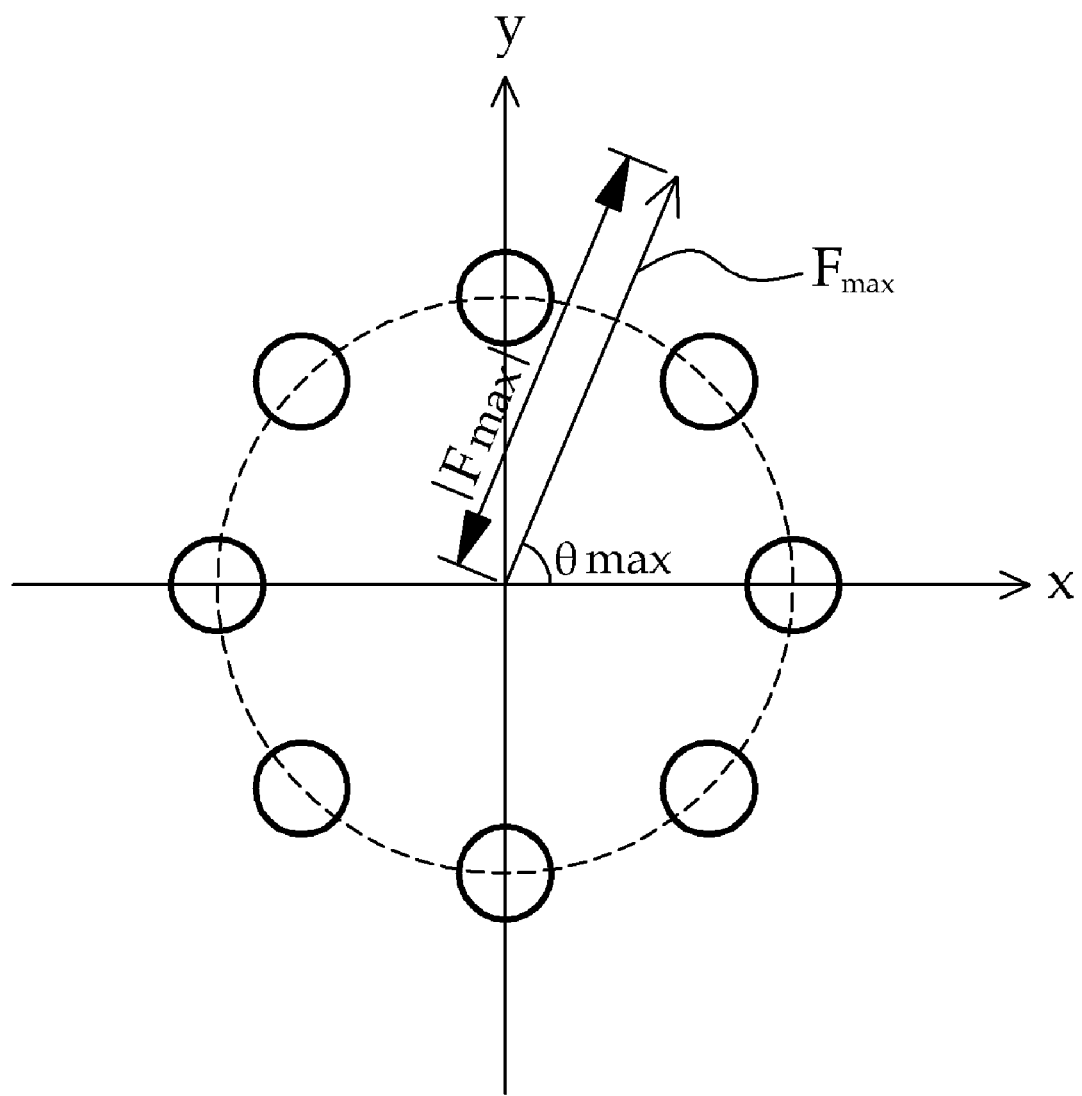

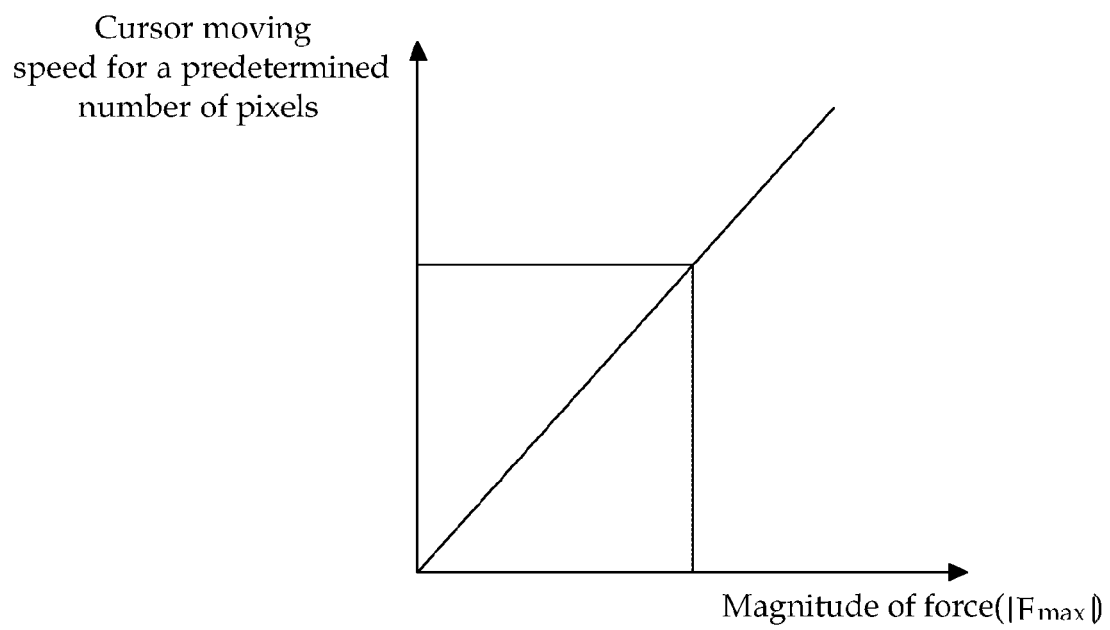

INPUT MODULE WITH CAPACITANCE SENSORS, METHOD FOR MANUFACTURING THE INPUT MODULE AND METHOD FOR CONSTRUCTING ALGORITHM FOR PROCESSING TOUCH INPUT APPLIED TO THE INPUT MODULE

CROSS-REFERENCE TO RELATED APPLICATION

This application claims priority under 35 U.S.C. §119(a) from Republic of Korea Patent Application No. 10-2008-0113108 filed on Nov. 14, 2008, which is incorporated by reference herein.

BACKGROUND OF THE INVENTION

1. Field of the Invention

The present invention relates to an input module with capacitance sensors, a method for manufacturing the input module and a method for constructing an algorithm for processing an input corresponding to force applied by a user's finger to the input module with the capacitance sensors. More particularly, the invention relates to an input module having a top plate, which can be deformed by force applied by a user's finger and has pitches formed thereon, and capacitance varied according to the magnitude of force applied by the user's finger, a method for manufacturing the input module and a method for constructing an algorithm that determines a specific force vector based on the center point of the top plate of the input module when force is applied to the input module and moves an input module cursor pixel by pixel using the specific force vector.

2. Background of the Related Art

There are various kinds of force measurement sensors including a contact resistance sensor that measures a resistance variation caused by force. This contact resistance sensor has a complicated structure and requires high cost and technique to bond a metal resistor included therein.

Accordingly, there is a demand for development of a capacitance sensor using a capacitance variation as a force measurement sensor. The capacitance sensor has capacitance from the relation between a user's finger and a metal included in the sensor and thus, when the user touches the capacitance sensor, the capacitance sensor senses the touch.

However, although the capacitance sensor can sense the touch because capacitance is rapidly formed when the capacitance sensor is touched, it is difficult for the capacitance sensor to correctly measure force when the capacitance sensor is touched and then the force is applied thereto by the user's finger. Accordingly, development of a capacitance sensor capable of sensing touch to provide an on/off function and correctly measuring force is demanded.

Furthermore, a technique of forming the capacitance sensor in an input module that moves a curser on a display, measuring force applied by a user's finger to a top plate of the input module and moving the cursor without moving the input module has been studied. However, the input module including the capacitance sensor also has a complicated structure and low production yield, and thus it is difficult to reduce the size of the input module.

Accordingly, a method for measuring force applied to the top plate of the input module using the capacitance sensor included in the input module to move the cursor is required. While the input module including the capacitance sensor has a simple structure, the input module cannot correctly measure force applied thereto because a capacitance variation caused by the force is small, and thus the input module cannot naturally move the cursor to a desired point. Accordingly, an input module with a capacitance sensor capable of measuring force with accuracy and allowing a user to freely move the cursor to a desired point and a method for manufacturing the input module are demanded.

Furthermore, an input module having a force measurement sensor requires an algorithm of moving a cursor on a monitor when a user applies force to a predetermined portion of the top plate of the input module. To construct this algorithm, it is required to obtain a specific force vector with respect to a portion to which specific force is applied in coordinates having the origin on the top plate of the input module. Accordingly, a method of setting the coordinates on the top plate of the input module and determining the specific force vector is required.

Moreover, it is required to analyze the motion of the cursor on a pixel-based display screen according to the specific force vector after the specific force vector with respect to the force applied to the input module is determined. Accordingly, a method of determining a cursor moving direction using the angle of the specific force vector and a method of smoothly moving the cursor on the display screen pixel by pixel to a desired direction are needed.

SUMMARY OF THE INVENTION

Accordingly, the present invention has been made in view of the above-mentioned problems occurring in the prior art, and it is a primary object of the present invention to provide an input module with capacitance sensors, which is able to sense touch applied by a user's finger to the input module and correctly measure the magnitude of force corresponding to the touch and move a cursor on a screen.

The input module is used to move the cursor on a display and technical characteristics of the present invention can be applied to an input module used for a cellular phone to allow a user to easily move the cursor to a desired position.

Fine pitches are formed on a top plate of the input module to maximize capacitance variations in the capacitance sensors due to a contact area variation when a user applies force to the top plate of the input module with his/her finger, and thus the user can move the cursor to a desired position through the capacitance sensors having a simple structure.

It is another object of the present invention to provide a method of measuring force applied by the user to a predetermined portion of the top plate of the input module using the capacitance sensors and determining the force applied to the predetermined portion as a specific force vector.

It is yet another object of the present invention to provide a method of moving the cursor to a desired direction using the angle of the specific force vector and varying a cursor moving speed according to the magnitude of force.

It is still another object of the present invention to provide a method for manufacturing an input module with capacitance sensors, which is able to correctly measure force, determine a specific force vector with the measured force and move the cursor to a position a user desires.

To accomplish the above object of the present invention, according to the present invention, there is provided an input module with capacitance sensors, which is included in a portable device and comprises a bottom plate having a center point; a plurality of electrodes formed at regular intervals on the top face of the bottom plate and arranged apart from the center point of the bottom plate by an equal distance; a top plate bonded to the top faces of the electrodes and deformed by force applied by a pointing object; an adhesive layer formed around the top plate and the bottom plate to combine the top plate and the bottom plate; and a controller recognizing a travel distance, travel direction and moving speed of a cursor on the basis of the magnitude and angle of the force applied by the pointing object according to capacitance sensors formed by the pointing object and the electrodes when the pointing object touches the top plate.

The input module may be included in a portable device having a display.

The top plate may have predetermined pitches formed on the top face thereof and a distance between the pointing object and the electrodes and the contact area of the pointing object and the top plate may be changed as the pointing object applies pressure to a predetermined point of the top plate to vary levels of capacitance of the capacitance sensors.

The top plate can be formed of an elastic insulator. Also, the pitches may have sizes in the range of 100 to 1000 µm.

In addition, the elastic insulator may be a polymer film, transparent sol or transparent gel and the transparent gel may be polydimethylsiloxane or silicon, and the plurality of electrodes may be formed of indium tin oxide or a metal.

Also, the present invention may further comprise a central electrode formed on a portion of the top face of the bottom plate, which corresponds to the center point, wherein when the pointing object applies force to a portion of the top plate, which corresponds to the central electrode, a click sensor that recognizes the applied force as click is formed. In addition, the input module may include two through sixteen electrodes as the plurality of electrodes arranged at regular intervals.

According to another aspect of the present invention, there is provided a method for constructing an algorithm for processing a touch input applied to the input module with capacitance sensors, the method comprising the steps of touching a predetermined point of the top plate through the pointing object to form a plurality of capacitance sensors . . . , $A_i$, $A_{i+1}$, . . . , $A_k$, $A_{k+1}$, . . . between the pointing object and the plurality of electrodes; applying force to the predetermined point of the top plate with the pointing object to vary levels of capacitance of the plurality of capacitance sensors . . . , $A_i$, $A_{i+1}$, . . . , $A_k$, $A_{k+1}$, . . . ; recognizing the force applied to the capacitance sensors from capacitance variations in the capacitance sensors and obtaining force vectors . . . , $F_i$, $F_{i+1}$, . . . , $F_k$, $F_{k+1}$, . . . with respect to the plurality of capacitance sensors, which respectively have magnitudes of force, . . . , $|F_i|$, $|F_{i+1}|$, . . . , $|F_k|$, $|F_{k+1}|$, . . . and angles . . . , $\theta_i$, $\theta_{i+1}$, . . . , $\theta_k$, $\theta_{k+1}$, . . . to an X axis of coordinates having the X axis and a Y axis, on the coordinates based on the central point; obtaining difference vectors . . . , $\Delta F_i$, $\Delta F_{i+1}$, . . . of the force vectors to determine a specific force vector $F_{max}$ having a magnitude of force $|F_{max}|$ and an angle $\theta_{max}$ respectively corresponding to the sum of the magnitudes of force and the sum of the angles of the force vectors with respect to the plurality of capacitance sensors; and determining the travel direction and the travel distance of the cursor using approximated coordinate values for a number of pixels, which is set using the angle $\theta_{max}$ of the specific force vector $F_{max}$, determining the moving speed of the cursor for the set number of pixels using the magnitude of force $|F_{max}|$ of the specific force vector $F_{max}$ and moving the cursor.

In the present invention, the step of determining the specific force vector $F_{max}$ may comprise the steps of finding the force vector $F_{i-1}$ of the (i+1)th capacitance sensor $A_{i+1}$, having a largest magnitude of force among the plurality of capacitance sensors and force vectors $F_i$ and $F_{i+2}$ of the ith capacitance sensor $A_i$ and the (i+2)th capacitance sensor $A_{i+2}$ located on both sides of the (i+1)th capacitance sensor $A_{i+1}$; selecting the force vector $F_i$ having a larger magnitude of force from the force vector $F_i$ of the ith capacitance sensor $A_i$ and the force vector $F_{i+2}$ of the (i+2)th capacitance sensor $A_{i+2}$; finding the force vector $F_k$ of the kth capacitance sensor $A_k$ that is symmetrical with respect to the origin for the ith capacitance sensor $A_i$ and the force vector $F_{k+2}$ of the (k+2)th capacitance sensor $A_{k-2}$ that is symmetrical with respect to the origin for the (i+2)th capacitance sensor $A_{i+2}$ and determining the difference vector $\Delta F_i$ of the force vectors $F_i$ and $F_k$ and the difference vector $\Delta F_{i+2}$ of the force vectors $F_{i+2}$ and $F_{k+2}$; and determining the specific force vector $F_{max}$ having the magnitude of force $|F_{max}|$ and an angle $\theta_{max}$, which respectively correspond to the sum of magnitudes of force and angles of the difference vectors $\Delta F_i$ and $\Delta F_{i+2}$.

Also, in the step of moving the cursor, pixel-based coordinates having the point at which the cursor is currently located as the origin (0, 0) and X and Y axes and, when a radius R from the origin corresponds to a predetermined number of pixels, coordinate values that determine the travel direction and the travel distance of the cursor and are close to a circle having the radius are approximated, and the cursor is moved to a specific coordinate value having an angle to the X axis clockwise, which is closest to the angle $\theta_{max}$ of the specific force vector $F_{max}$, among the coordinate values.

When the radius R corresponds to two pixels, the coordinate values are approximated to (2, 0), (2, 1), (2, 2), (1, 2), (0, 2), (−1, 2), (−2, 2), (−2, 1), (−2, 0), (−2, −1), (−2, −2), (−1, −2), (0, −2), (1, −2), (2, −2) and (2, −1) and the cursor is moved to a specific coordinate value having an angle to the X axis clockwise, which is closest to the angle $\theta_{max}$ of the specific force vector $F_{max}$, among the coordinate values.

In addition, when the radius R corresponds to four pixels, the coordinate values are approximated to (4, 0), (4, 1), (4, 2), (4, 3), (3, 3), (3, 4), (2, 4), (1, 4), (0, 4), (−1, 4), (−2, 4), (−3, 4), (−3, 3), (−4, 3), (−4, 2), (−4, 1), (−4, 0), (−4, −1), (−4, −2), (−4, −3), (−3, −3), (−3, −4), (−2, −4), (−1, −4), (0, −4), (1, −4), (2, −4), (3, −4), (3, −3), (4, −3), (4, −2) and (4, −1) and the cursor is moved to a specific coordinate value having an angle to the X axis clockwise, which is closest to the angle $\theta_{max}$ of the specific force vector $F_{max}$, among the coordinate values.

According to the present invention, the moving speed of the cursor for the predetermined number of pixels is proportional to the magnitude of force of the specific force vector $F_{max}$.

The present invention further comprises the step of continuously calculating the specific force vector when force is applied to a predetermined portion of the top plate of the input module, determining the travel direction of the cursor using the approximated coordinate values according to the angle of the specific force vector and determining the moving speed for the predetermined number of pixels according to the magnitude of force of the specific force vector after the step of moving the cursor.

Also, when at least one of the plurality of capacitance sensors senses impulse force, the cursor executes a click function.

In addition, when force is applied by the pointing object to the center of the top plate, the click sensor recognizes the force as click and opens or closes a file corresponding to the point at which the cursor is located and, when the capacitance sensors sense force after the click sensor recognizes the click, a scroll function is executed along the travel direction of the cursor according to the specific force vector.

According to still another aspect of the present invention, there is provided a method for manufacturing the input module with capacitance sensors, included in a portable device, the method comprising the steps of forming a bottom plate having a center point; forming a plurality of electrodes on the top face of the bottom plate in such a manner that the plurality of electrodes are arranged apart from the center point by an equal distance and at regular intervals; bonding a top plate deformed with force applied by a pointing object to the top faces of the electrodes; and forming an adhesive layer between the top plate and the bottom plate to combine and fix the top plate and the bottom plate.

Also, the top plate is formed of an elastic insulator and has specific pitches formed on the top face thereof, the elastic insulator is a polymer film, transparent sol or transparent gel, the transparent gel may be polydimethylsiloxane or silicon, and the pitches have sizes in the range of 100 to 1000 μm.

In addition, the electrodes are formed of indium tin oxide or a metal and the input module has two through sixteen electrodes.

Also, the step of forming the electrodes may comprise the step of forming a central electrode at the center of the top face of the bottom plate to form a click recognition unit for recognizing click according to the pointing object.

BRIEF DESCRIPTION OF THE DRAWINGS

The above and other objects, features and advantages of the present invention will be apparent from the following detailed description of the preferred embodiments of the invention in conjunction with the accompanying drawings.

FIG. 1b is a cross-sectional view taken along line A-A of FIG. 1a.

FIG. 2b is a cross-sectional view taken along line B-B of FIG. 2a.

FIG. 3c is a graph illustrating a capacitance variation when force is applied by a finger.

FIG. 6a illustrates the magnitude of force and angle of a specific force vector in coordinates on the input module.

FIG. 7b is a graph illustrating the relationship between a calculated input module cursor moving speed for a set number of pixels and magnitude of force.

FIG. 8b illustrates a moving trace of the input module cursor when the user's finger presses the input module while drawing the arch in FIG. 8a.

DETAILED DESCRIPTION OF THE PREFERRED EMBODIMENT (Configuration of an Input Module with Capacitance Sensors)

Figure 1A:
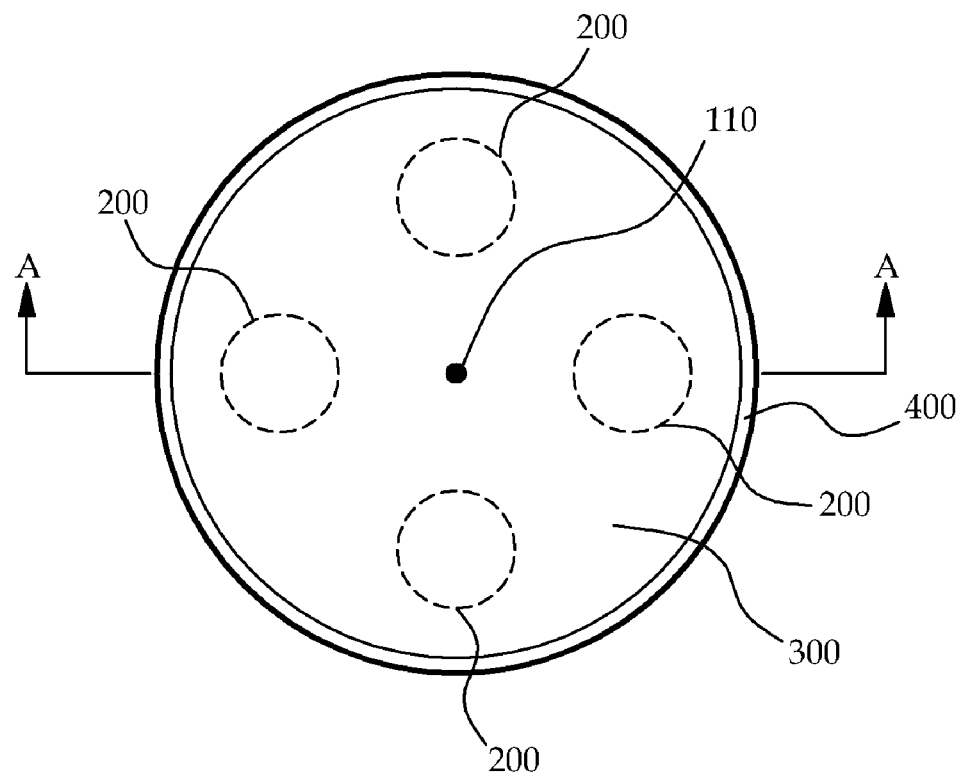
FIG. 1a is a plan view of an input module with capacitance sensors, which has four electrodes.

The configuration of an input module with capacitance sensors will now be explained with reference to attached drawings. FIG. 1a is a plan view of the input module including four capacitance sensors and FIG. 1b is a cross-sectional view taken along line A-A of FIG. 1a.

Figure 1B:
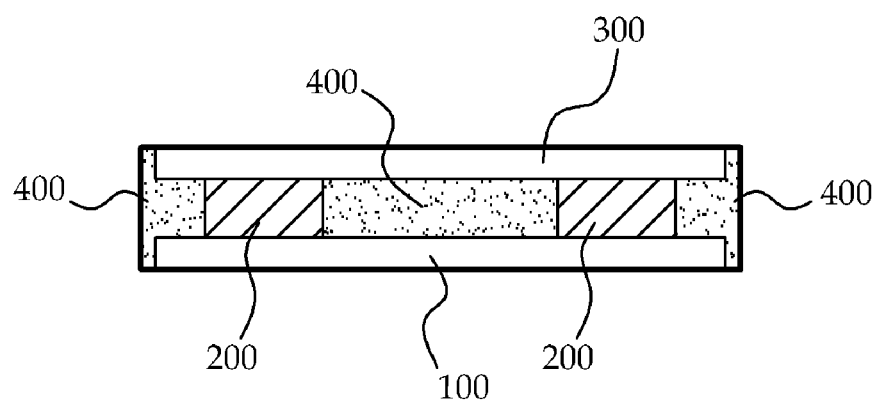

Referring to FIGS. 1a and 1b, the input module with the capacitance sensors includes a bottom plate 100 having a center point 110 and four electrodes 200 formed at regular intervals and apart from the center point 110 of the bottom plate 100 by an equal distance. The input module further includes a top plate 300 in contact with the top faces of the electrodes 200 and an adhesive layer 400 combining the top plate 300 and the bottom plate 100. The adhesive layer 400 is filled in an inner space between the top plate 300 and the bottom plate 100.

The bottom face of the bottom plate 100 touches the ground and has the center point 110. The material of the bottom plate 110 is not limited. The plurality of electrodes 200 are formed on the top face of the bottom plate 100. As illustrated in FIG. 1a, the electrodes 200 are formed apart from the center point 110 by an equal distance and arranged at regular intervals. In the current embodiment of the present invention, the electrodes 200 are respectively formed at an angle of 90° based on the center point 110 of the bottom plate 100. The electrodes 200 are formed of a conductive metal material, preferably, indium tin oxide or a general metal.

The electrodes 400 are bonded to the top plate 300 that is formed of an insulating material. When a pointing object touches a predetermined portion of the top plate 300, the point object and the electrodes 200 form capacitance sensors having capacitance. The pointing object is a part of the human body through which current flows, which is a finger mostly. The pointing object corresponds to a finger hereinafter. When the finger touches the top face of the top plate 300, the finger and the electrodes 200 function as electrodes and thus they have capacitance, and the top plate 300 serves as a dielectric. The top plate 300 is made of an insulating material, preferably, a polymer film.

The top plate 300 is formed of an elastic material and thus the top plate 300 can be deformed when the finger presses the top face thereof. As the pressing force of the finger increases, a distance between the finger and the electrodes 200 decreases and the capacitance increases. Accordingly, the capacitance sensors can measure the pressing force of the finger.

Figure 2A:
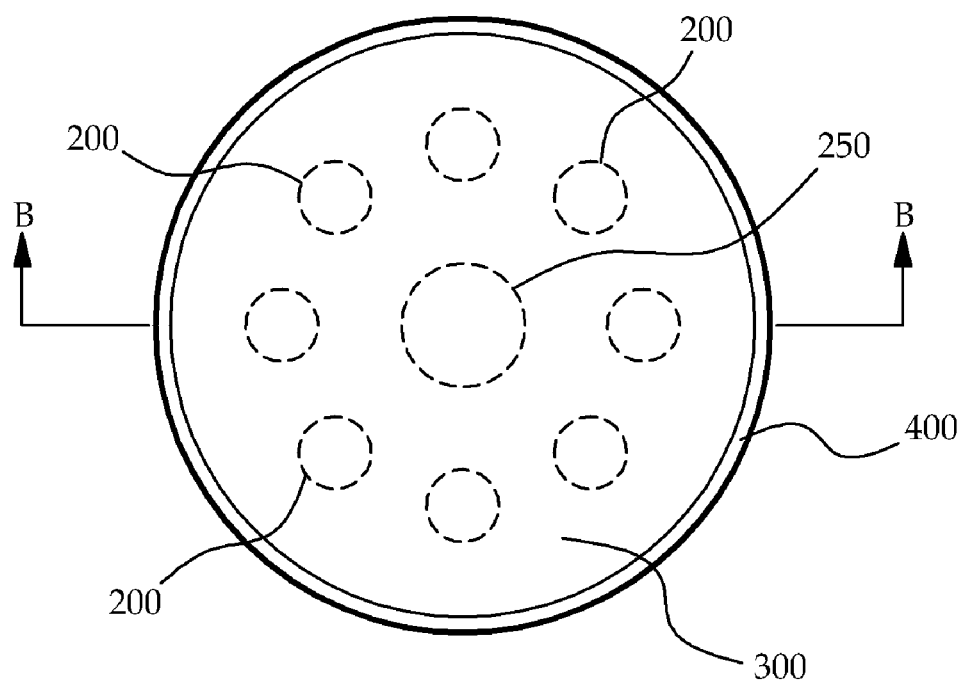
FIG. 2a is a plan view of an input module with capacitance sensors, which has eight electrodes and a central electrode.
Figure 2B:
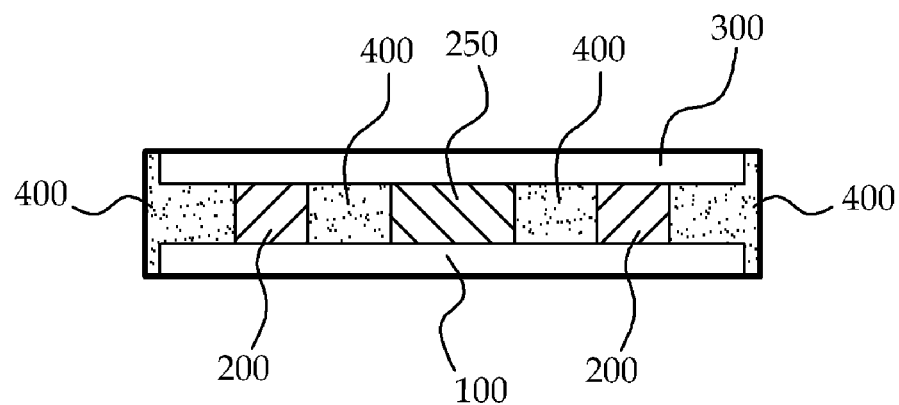

FIG. 2a is a plan view of an input module including eight electrodes 200 and a single central electrode 250 and FIG. 2b is a cross-sectional view taken along line B-B of FIG. 2a. The electrodes 200 are formed apart from the center point 110 of the bottom plate 100 by an equal distance and respectively arranged at an angle of 45° based on the center point 110. While the number of electrodes 200 is not limited if the electrodes 200 are arranged at regular intervals based on the center point 110 of the bottom plate 100, four through sixteen electrodes are suitable.

As illustrated in FIG. 2a, the input module can further include the central electrode 250 formed at a portion corresponding to the center point 110 of the bottom plate 100. When the finger applies force to a portion of the top plate, which corresponds to the central electrode 250, a click sensor that recognizes the applied force as click is formed. Accordingly, when a user applies pressure to the center of the top plate 300 with his/her finger, a point at which a cursor is currently located is clicked to open or close a file.

The input module further includes the adhesive layer 400 combining the top plate 300 and the bottom plate 100. As illustrated in FIGS. 1a and 2a, the edge of the top plate 300 and the edge of the bottom plate 100 are combined by the adhesive layer 400 and fixed. The inner space formed between the top plate 300 and the bottom plate 100 can be filled with the adhesive layer 400. The top plate 300 is formed of an elastic material such as a polymer film, transparent sol or transparent gel. The transparent gel may be polydimethylsiloxane or silicon.

Figure 3A:
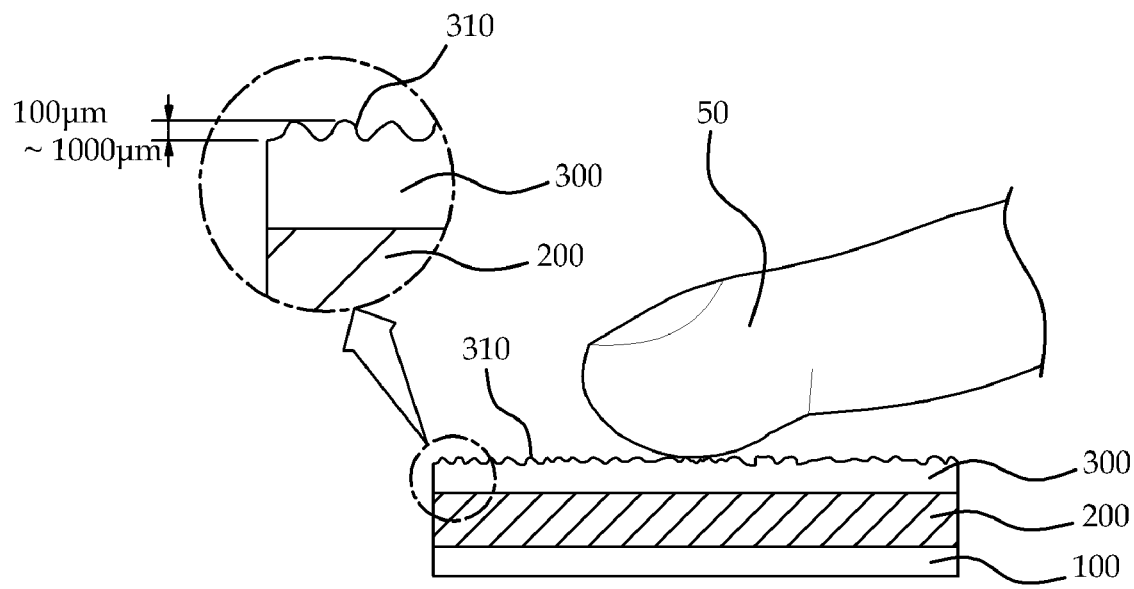
FIG. 3a illustrates that a finger touches the surface of a top plate having pitches.
Figure 3B:
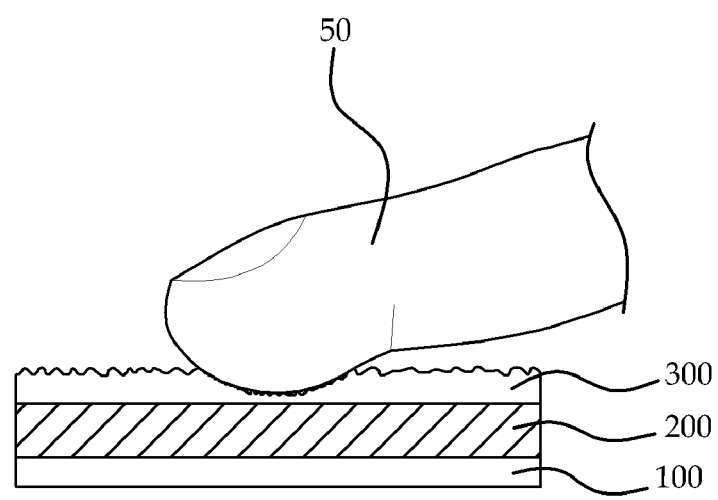
FIG. 3b illustrates that force is applied by a finger to the surface of the top plate having pitches.

FIGS. 3a and 3b illustrate the input module with capacitance sensors having fine pitches 310 formed on the top face of the top plate 300. The pitches 310 have sizes in the range of 100 to 1000 μm. When the pitches 310 are formed on the top plate 300, a capacitance variation can be maximized when a finger 50 applies force to the top face of the top plate 300 as compared to the case that the top plate 300 has no pitch.

FIG. 3a illustrates the input module when the finger 50 touches the top face of the top plate 300 and FIG. 3b illustrates that the finger 50 applies force to the top face of the top plate 300 to deform the top plate 300. As illustrated in FIG. 3b, the contact area of the top face of the top plate 300 and the finger 50 increases when the finger applies force to the top face of the top plate 300. Accordingly, in the case that the top plate 300 has the pitches 310, a distance between the finger 50 and the electrodes 200 decreases and the contact area of the finger 50 and the top face of the top plate 300 increases when force is applied to the top face of the top plate 300, and thus a capacitance variation remarkably increases.

FIG. 3c is a graph illustrating a capacitance variation according to magnitude of force when the top plate 300 has the pitches 310 and when the top plate 300 has no pitch. In FIG. 3c, a section (b) represents that capacitance is abruptly generated when a finger touches the top face of the top plate of the input module. In this section, capacitance is abruptly varied according to weak force, and thus it is difficult to measure a variation in the capacitance. A section (a) represents a capacitance variation which occurs when the finger touches the input module having no pitch and then applies force to the input module. A section (a') represents a capacitance variation which occurs when the finger touches the input module having the pitches 310 and then applies force thereto. It can be known from FIG. 3c that the capacitance variation in the input module having the pitches is greater than the capacitance variation in the input module having no pitch for the same magnitude of force. Accordingly, it is possible to increase capacitance sensitivity to correctly measure the force applied to the input module.

(Method of Constructing an Algorithm for Processing a Touch Input)

Figure 4:
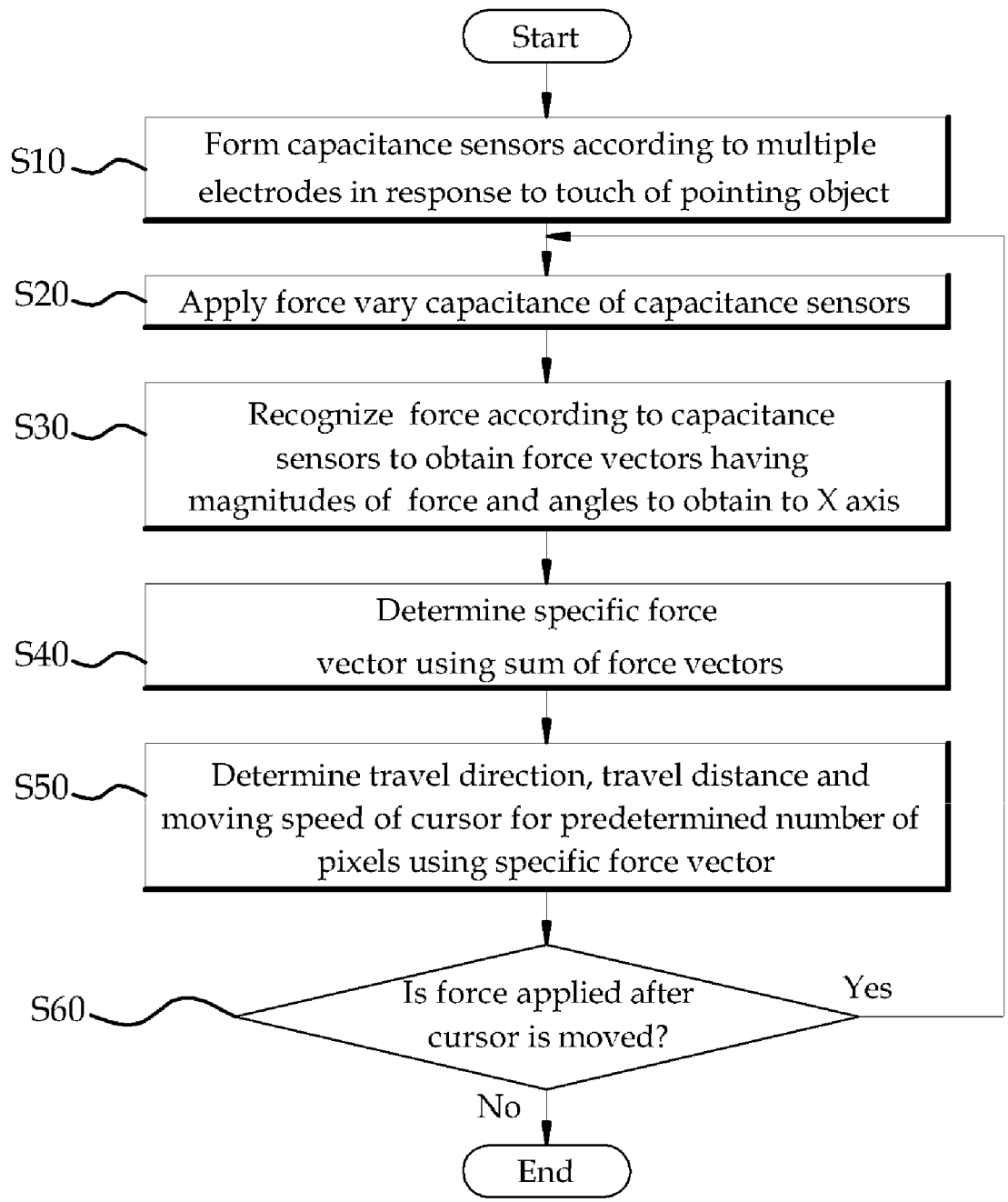
FIG. 4 is a flow chart of a method of constructing an algorithm for processing a touch input.

A method of constructing the algorithm for processing a touch input when force is applied to the input module with capacitance sensors will now be explained with reference to the attached drawings. FIG. 4 is a flow chart of the method of constructing the algorithm for processing a touch input. In the method illustrated in FIG. 4, the capacitance sensors included in the input module recognize force, which is applied by a finger to the top face of the top plate of the input module, as a vector and movement of a cursor is determined using the vector.

A user touches the top face of the input module with his/her finger such that a plurality of capacitance sensors are respectively formed between the finger and the plurality of electrodes 200 in step S10. The electrodes 200 are formed as described above and the input module includes eight electrodes 200 in the current embodiment of the present invention. Accordingly, when the user's finger touches the top face of the top plate 300, eight capacitance sensors are formed.

Figure 5A:
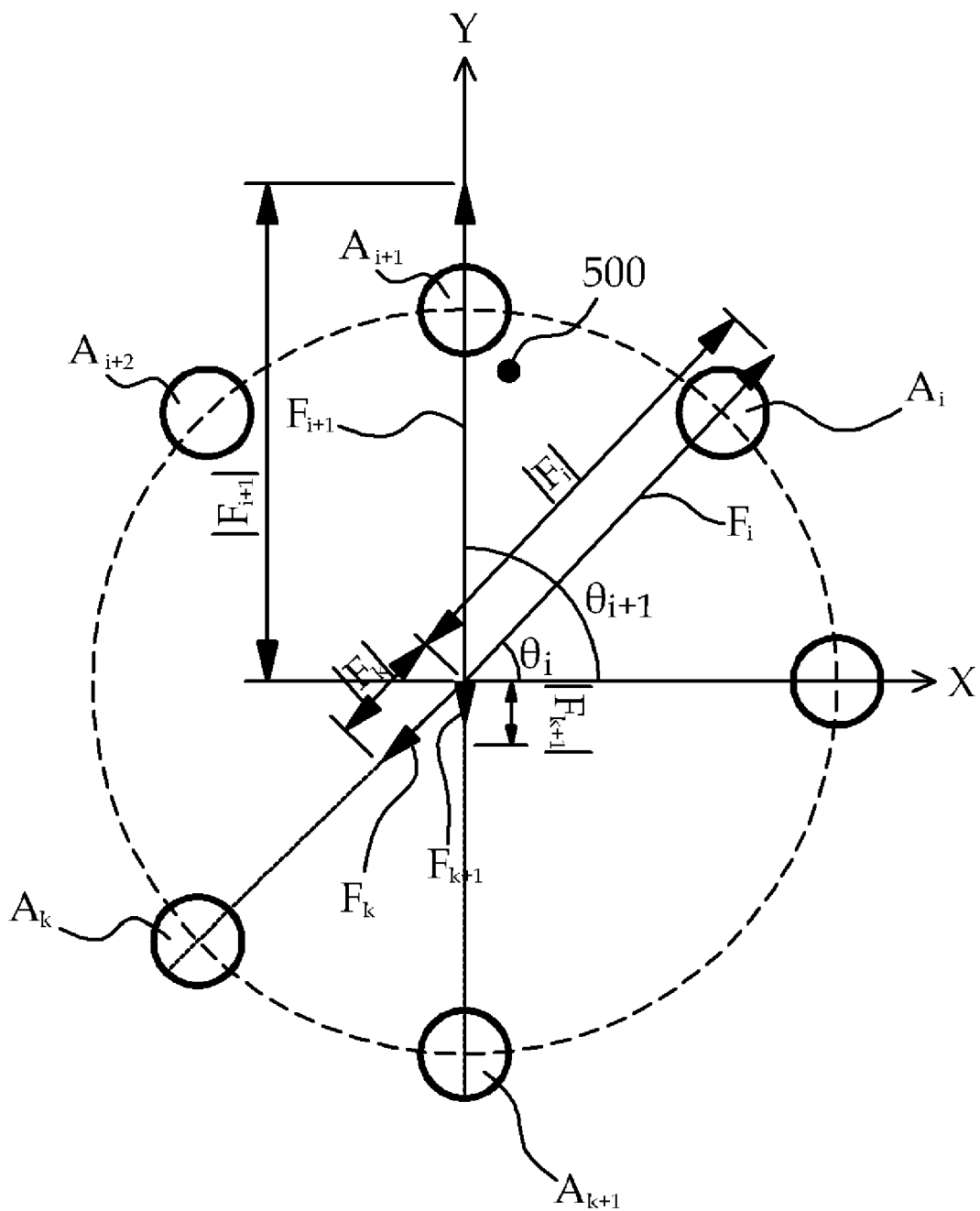
FIG. 5a illustrates force vectors having magnitudes and directions of force measured by capacitance sensors of the input module.
Figure 5B:
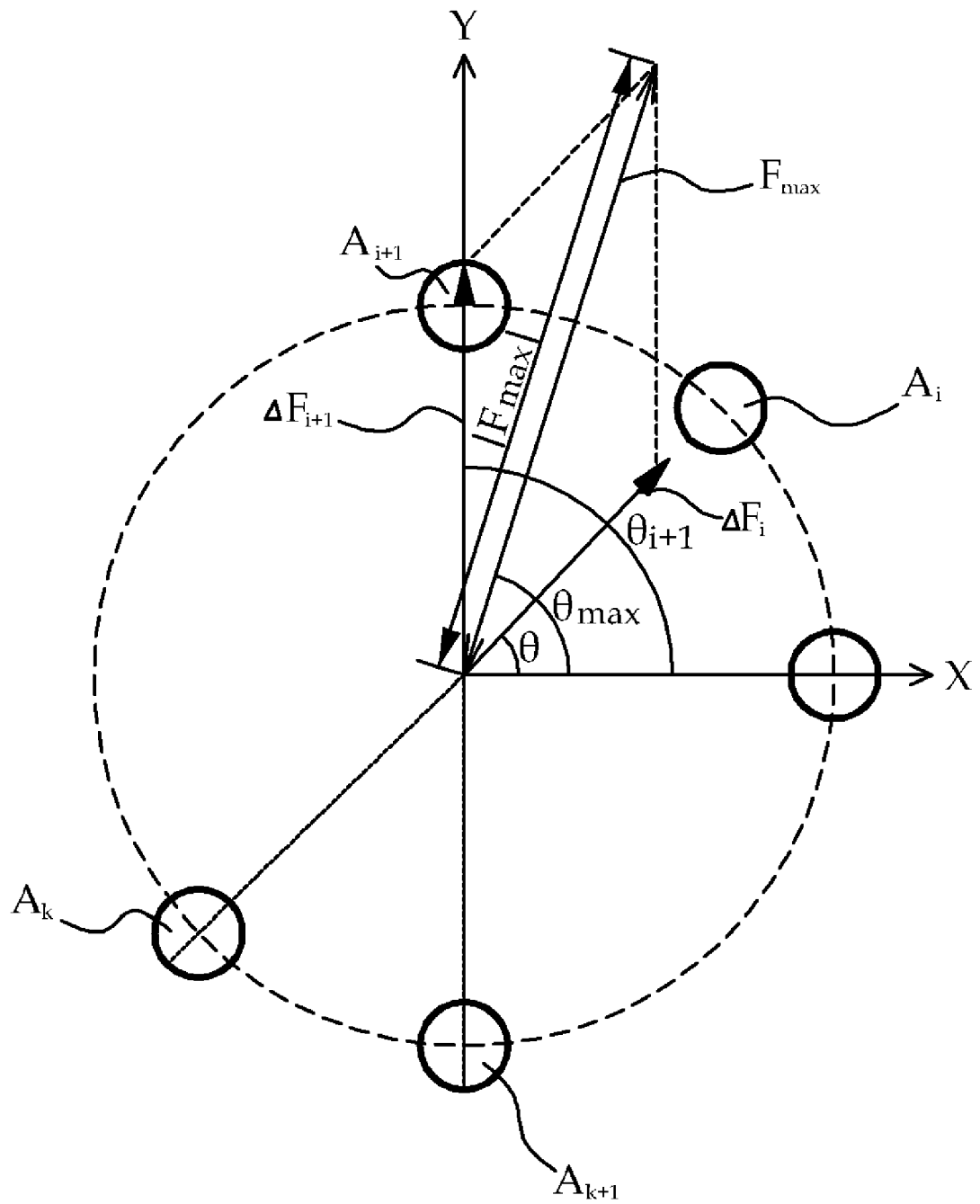
FIG. 5b illustrates a method of determining a specific force vector from the sum of force vectors of capacitance sensors.

When the user's finger touches the top face of the top plate 300 and then presses the top plate 300 with force, capacitance of each capacitance sensor is varied in step S20. Capacitance variations in the capacitance sensors are measured to recognize the magnitude of force. Here, the capacitance sensor closest to the portion pressed by the user's finger has the largest capacitance variation. Each of the capacitance sensors obtains a force vector having a magnitude of force and an angle according to the capacitance variation thereof in step S30. FIGS. 5a and 5b illustrate a method of determining a specific force vector $F_{max}$ using the sum of angles and the sum of magnitudes of force in coordinates that have the center point 110 of the input module as the origin (0, 0), an X axis and a Y axis when force is applied to the input module.

FIG. 5a illustrates a force vector $F_i$ measured from a capacitance sensor $A_i$, a force vector $F_{i+1}$ measured from a capacitance sensor $A_{i+1}$ and vectors $F_{k+1}$ and $F_k$. Here, the vectors $F_{i+1}$ and $F_{k+1}$ are symmetrical with respect to the origin and the vectors $F_k$ and $F_i$ are symmetrical with respect to the origin. When the capacitance sensor $A_{i+1}$ corresponds to a capacitance sensor having the largest capacitance variation when force is applied to the top face of the top plate of the input module, that is, a capacitance sensor on which the largest magnitude of force acts, the method of determining the specific force vector $F_{max}$ obtains the force vector $F_{i+1}$ with respect to the capacitance sensor $A_{i+1}$ and finds force vectors $F_{i+2}$ and $F_i$ of capacitance sensors $A_{i+2}$ and $A_i$ located near the capacitance sensor $A_{i+1}$. Then, the method selects one of the force vectors $F_{i+2}$ and $F_i$, which has a magnitude of force greater than that of the other. Referring to FIG. 5a, the force vector $F_i$ is selected.

FIG. 5b illustrates difference vectors $\Delta F_{i+1}$ and $\Delta F_i$ and the specific force vector $F_{max}$. Referring to FIG. 5b, the vectors $F_{k+1}$ and $F_k$ are found and the difference vector $\Delta F_{i+1}=F_{i+1}-F_{k+1}$ of the vectors $F_{i+1}$ and $F_{k+1}$ and the difference vector $\Delta F_i=F_i-F_k$ of the vectors $F_i$ and $F_k$ are calculated. The specific force vector $F_{max}$ is determined from the sum of the calculated difference vectors $\Delta F_{i+1}$ and $\Delta F_i$ in step S40 illustrated in FIG. 4. The specific force vector $F_{max}$ has an angle $\theta_{max}$ to the X axis and a magnitude of force $|F_{max}|$.

When the specific force vector $F_{max}$ is determined, the travel distance and travel direction of the cursor are determined using the angle $\theta_{max}$ of the specific force vector $F_{max}$ in step S50 illustrated in FIG. 4. A screen on which the cursor is moved is divided into pixels. A pixel size depends on the resolution of the screen. Specifically, the Y axis of the screen is divided into 800 and the X axis of the screen is divided into 400 when the screen has a resolution of 800*400. Accordingly, the screen has 320,000 microscopic squares. Each of sides forming a square is defined as a pixel.

When the cursor is moved, the cursor can be indicated on coordinates having the point at which the cursor is currently located as the origin (0, 0), an X axis and a Y axis. When the angle $\theta_{max}$ of the specific force vector $F_{max}$ is determined, the cursor is moved under the condition that a radius R is specific. Here, the radius R represents a distance that the cursor is moved and corresponds to the number of pixels located between the origin and the current position of the cursor.

FIG. 6a illustrates the magnitude of force $|F_{max}|$ and the angle $\theta_{max}$ of the specific force vector $F_{max}$ of the input module. Here, the angle $\theta_{max}$ to the X axis corresponds to 65°.

Figure 6B:
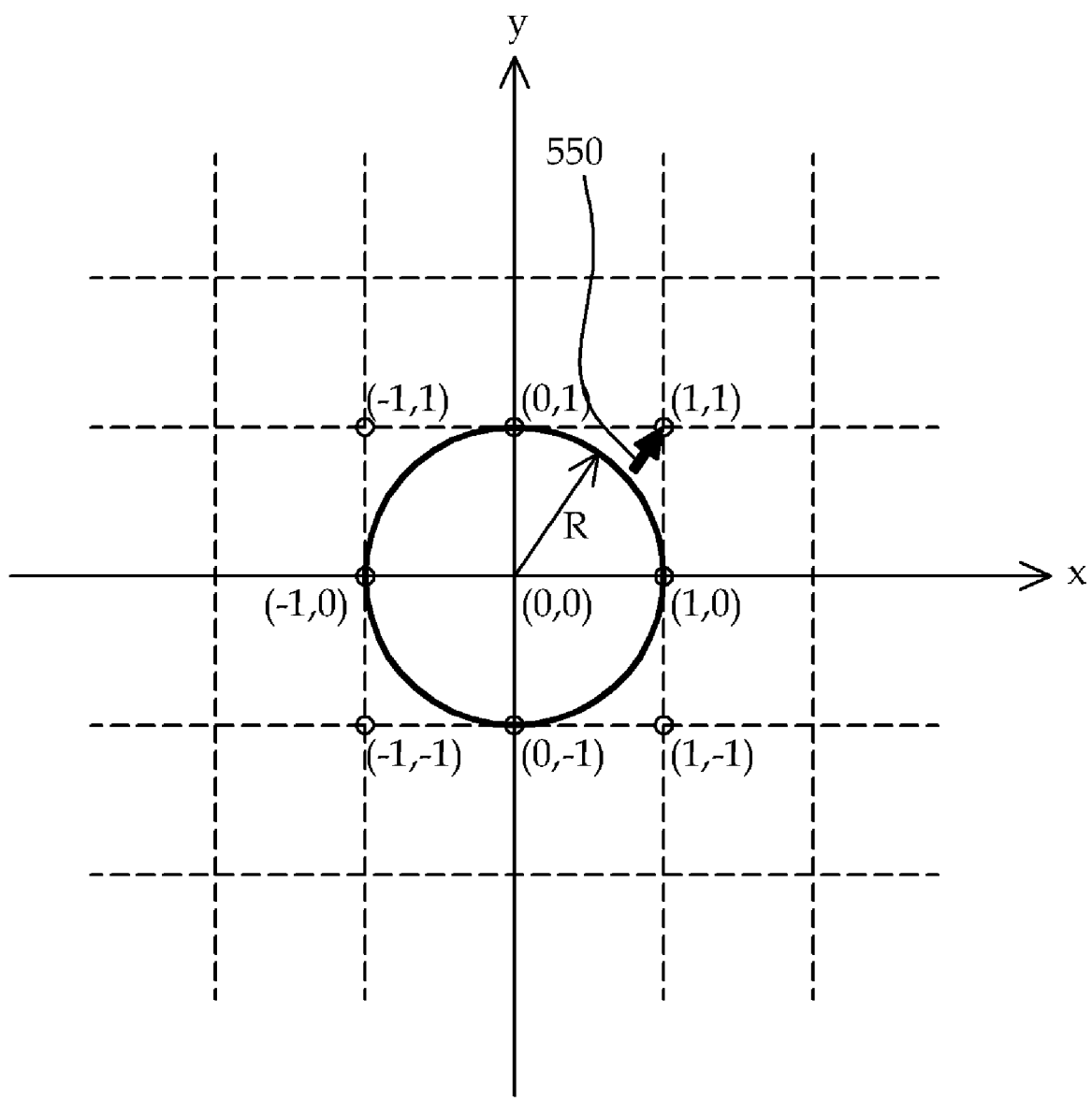
FIG. 6b shows coordinates on a screen, which illustrates a method of determining a travel direction and a travel distance of an input module cursor using the angle of the specific vector when R corresponds to one pixel.

FIG. 6b illustrates the travel direction and the travel distance of the cursor when the radius R with respect to the specific force vector $F_{max}$ is set to one pixel. When the radius R corresponds to one pixel, coordinate values of the cursor are determined as (1, 0), (0, 1), (−1, 0) and (0, −1). The travel direction of the cursor is determined such that the cursor is moved to a coordinate value having an angle (90° in the case of (0, 1)) to the X axis clockwise, which is closest to the angle $\theta_{max}$ of the specific force vector $F_{max}$, among the coordinate values.

While angle resolution is 90° when the radius R corresponds to one pixel, the coordinate values can be approximated to (1, 0), (1, 1), (0, 1), (−1, 1), (−1, 0), (−1, −1), (0, −1) and (1, −1) when the radius R approximates 1 and the angle resolution is set to 45°. A coordinate value (1.414, 1.414) is approximated to the coordinate value (1, 1) because pixel-based coordinate values cannot have a decimal point.

The angle $\theta_{max}$ of the specific force vector $F_{max}$ corresponds to 65° in the current embodiment of the present invention, and thus the cursor is moved to the coordinate value (1, 1) having an angle closest to the angle $\theta_{max}$ of the specific force vector $F_{max}$. When the cursor reaches (1, 1) and force is continuously applied to the input module, the specific force vector is obtained again and the cursor is continuously moved to a coordinate value having an angle closest to the angle of the obtained specific force vector, having (1, 1) as the origin. This is continued until force is not applied to the top face of the top plate of the input module in step S60. When the radius R is set to one pixel, as described above, the cursor is moved while maintaining the radius R (corresponding to one pixel).

Figure 6C:
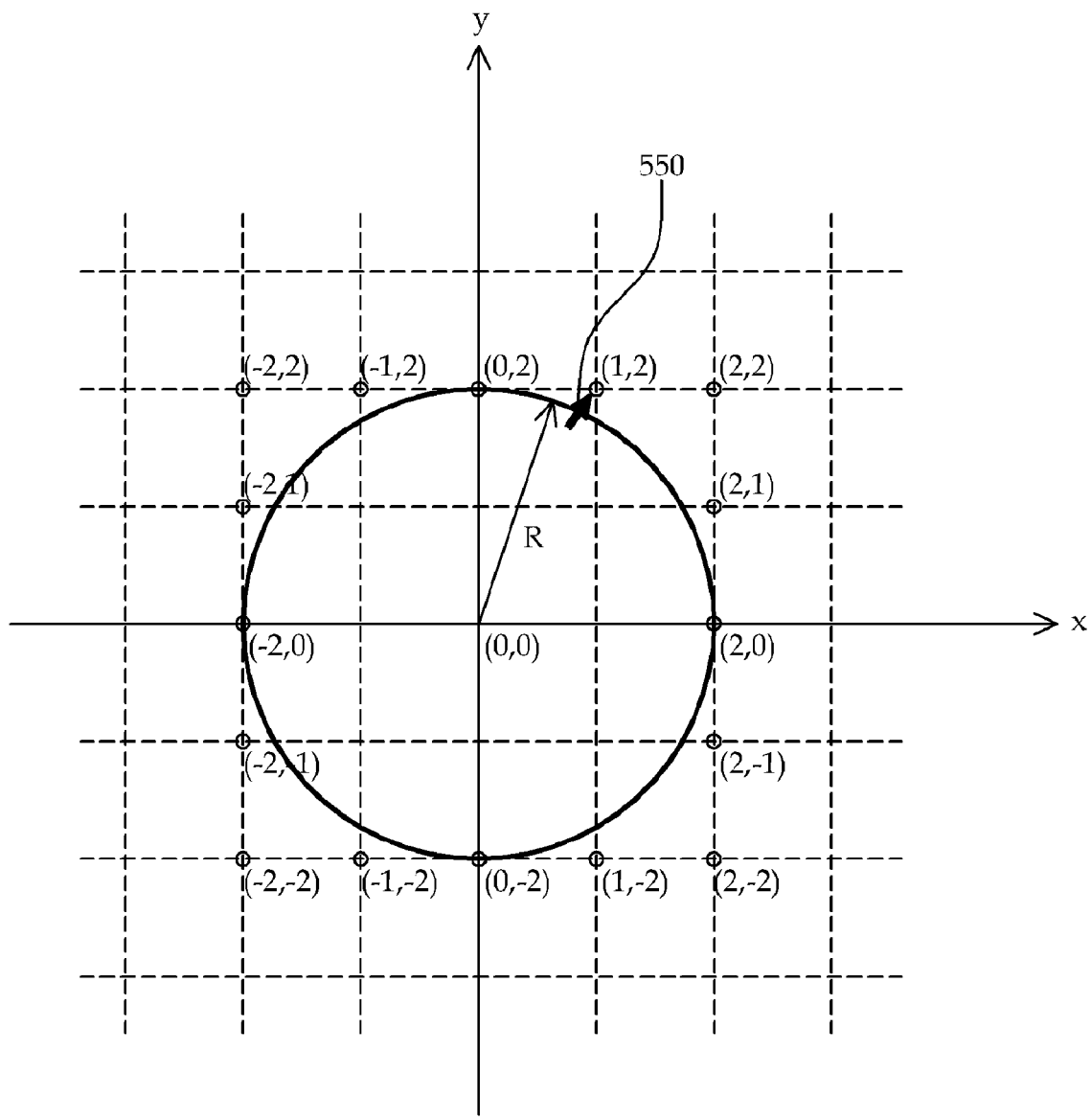
FIG. 6c shows coordinates on the screen, which illustrates a method of determining the travel direction and the travel distance of the input module cursor using the angle of the specific vector when R corresponds to two pixels.

FIG. 6c illustrates a method of determining the travel direction and the travel distance of the cursor for increasing travel direction resolution when radius R is set to two pixels. Referring to FIG. 6c, when the radius R is set to two pixels, the point at which the cursor is currently located corresponds to the origin (0, 0) and coordinate values can be approximated to (2, 0), (2, 1), (2, 2), (1, 2), (0, 2), (−1, 2), (−2, 2), (−2, 1), (−2, 0), (−2, −1), (−2, −2), (−1, −2), (0, −2), (1, −2), (2, −2) and (2, −1). The cursor cannot be moved while maintaining the radius R all the time when the radius R corresponds to two pixels. The coordinate value (1.414, 1.414) is approximated to the coordinate value (2, 2) because pixel-based coordinate values cannot have a decimal point. The travel direction of the cursor is determined such that the cursor is moved to a coordinate value having an angle (for example, 45° in the case of (2, 2)) to the X axis clockwise, which is closest to the angle $\theta_{max}$ of the specific force vector.

The angle $\theta_{max}$ of the specific force vector $F_{max}$ corresponds to 65° in the current embodiment of the present invention, and thus the cursor is moved to the coordinate value (1, 2) having an angle closest to the angle $\theta_{max}$ of the specific force vector $F_{max}$. When the cursor reaches (1, 2) and force is continuously applied to the input module, the specific force vector $F_{max}$ is obtained again and the cursor is continuously moved to a coordinate value having an angle closest to the angle of the obtained specific force vector, having the coordinate value (1, 2) as the origin. This is continued until force is not applied to the top face of the top plate of the input module.

Figure 6D:
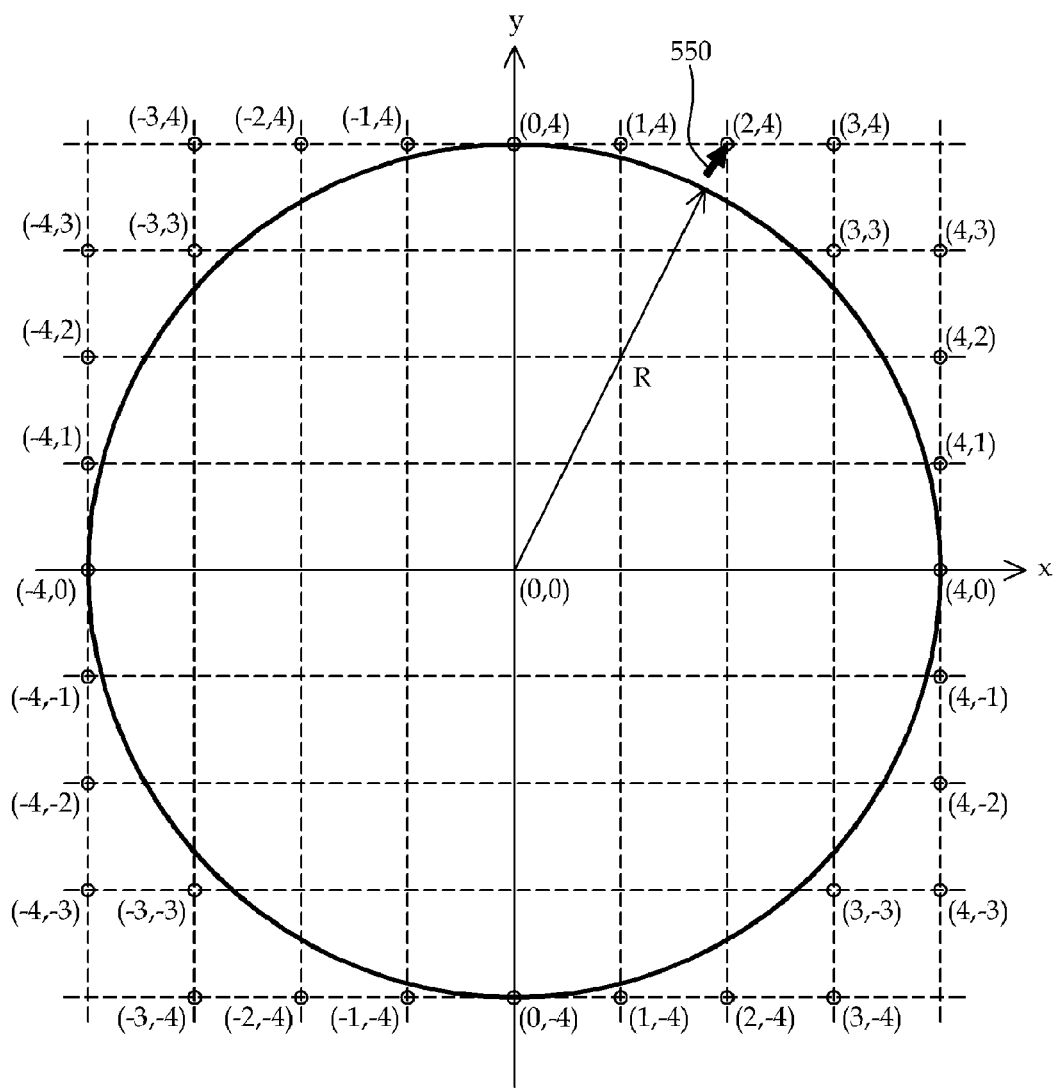
FIG. 6d shows coordinates on the screen, which illustrates a method of determining the travel direction and the travel distance of the input module cursor using the angle of the specific vector when R corresponds to four pixels.

FIG. 6d illustrates a method of determining the travel direction and the travel distance of the cursor when the radius R is set to four pixels. Referring to FIG. 6d, when the radius R is set to four pixels, the point at which the cursor is currently located corresponds to the origin (0, 0) and coordinate values are approximated to (4, 0), (4, 1), (4, 2), (4, 3), (3, 3), (3, 4), (2, 4), (1, 4), (0, 4), (−1, 4), (−2, 4), (−3, 4), (−3, 3), (−4, 3), (−4, 2), (−4, 1), (−4, 0), (−4, −1), (−4, −2), (−4, −3), (−3, −3), (−3, −4), (−2, −4), (−1, −4), (0, −4), (1, −4), (2, −4), (3, −4), (3, −3), (4, −3), (4, −2) and (4, −1) since the cursor cannot be moved while maintaining the radius R. The travel direction of the cursor is determined such that the cursor is moved to a coordinate value having an angle (for example, 63° in the case of (2, 4)) to the X axis clockwise, which is closest to the angle $\theta_{max}$ of the specific force vector.

When the radius R is small, the travel direction resolution decreases and thus the curvature of the cursor is difficult to obtain. If the radius R is increased in order to improve the travel direction resolution, the cursor is not smoothly moved on a display with low resolution. Accordingly, a radius in the range of 2 to 10 is suitable in consideration of the travel direction resolution and smooth movement of the cursor.

The angle $\theta_{max}$ of the specific force vector $F_{max}$ corresponds to 65° in the current embodiment of the present invention, and thus the cursor is moved to the coordinate value (2, 4) having an angle closest to the angle $\theta_{max}$ of the specific force vector $F_{max}$. When the cursor reaches (2, 4) and force is continuously applied to the input module, the specific force vector $F_{max}$ is obtained again and the cursor is continuously moved to a coordinate value having an angle closest to the angle of the obtained specific force vector, having the coordinate value (2, 4) as the origin. This is continued until force is not applied to the top face of the top plate of the input module.

Figure 7A:
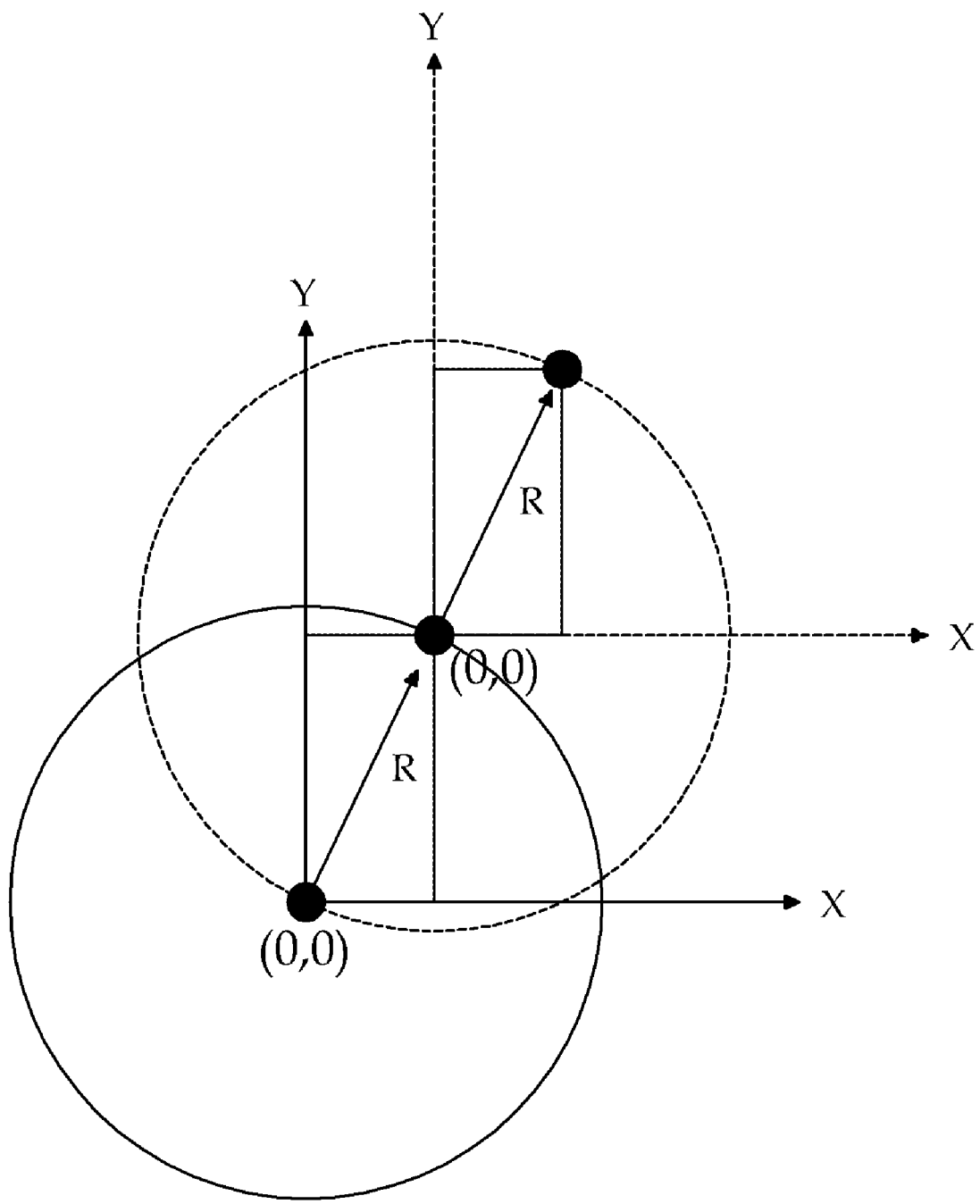
FIG. 7a illustrates movement of the cursor by R.

The moving speed of the cursor for the predetermined number of pixels, which corresponds to R, is proportional to the magnitude of force $|F_{max}|$ of the specific force vector $F_{max}$. FIG. 7a illustrates that the cursor is moved on the screen by R and FIG. 7b is a graph having a horizontal axis representing the magnitude of force $|F_{max}|$ of the specific force vector and a vertical axis representing the moving speed of the cursor per R. As illustrated in FIG. 7b, the magnitude of force $|F_{max}|$ is proportional to the moving speed of the cursor per R. Accordingly, the moving speed of the cursor increases as force applied to the input module increases.

When force applied by a finger to the input module is impulse force, the capacitance sensors recognize the applied force as click and the cursor opens or closes a file corresponding to the point at which the cursor is located. As described above, the central electrode 250 can be formed near the center point of the input module to form a click sensor, as illustrated in FIGS. 2a and 2b. When a user applies a predetermined magnitude of force to a portion near the center of the input module with his/her finger, the click sensor recognizes the force as click. When the capacitance sensors sense the force after the click sensor recognizes the click, a scroll function is executed along the travel direction of the cursor according to the specific force vector $F_{max}$.

Figure 8A:
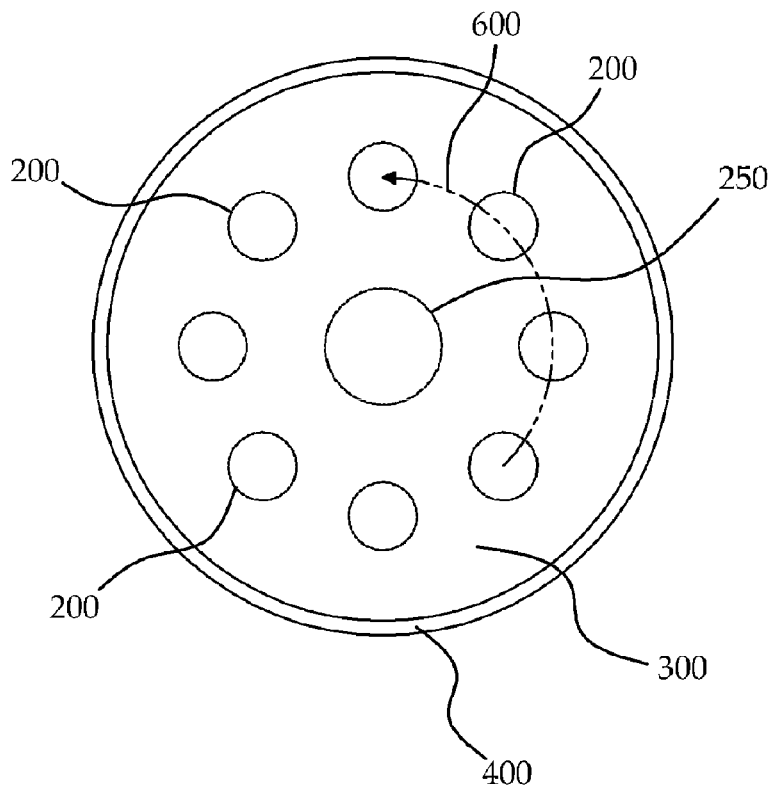
FIG. 8a is a plan view of the input module when a user's finger presses the input module while drawing an arch.
Figure 8B:
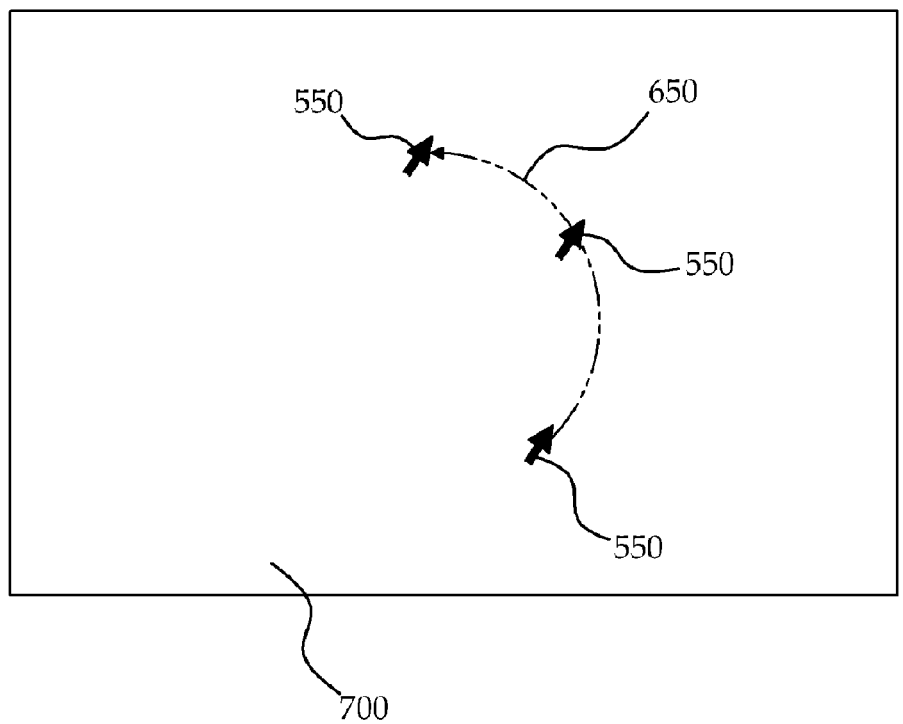

FIG. 8a illustrates that force is applied to the top face of the top plate 300 of the input module in a direction indicated by an arrow and FIG. 8b illustrates movement of a cursor 550 on a screen 700 when the force is applied to the input module as illustrated in FIG. 8a. Since the cursor 550 is moved according to the force applied by a finger to the top face of the top plate 300 of the input module until force is not applied to the input module any more and the specific force vector is continuously calculated in real time, a variation in the angle of the specific force vector appears as motion of the cursor 550 on the screen 700. Furthermore, when the cursor is rapidly moved in the direction indicated by the arrow, the cursor is moved while drawing a smaller circle. The magnitude of force applied to the input module is proportional to the moving speed of the cursor for the set number of pixels, and thus the cursor 550 is moved on the screen 700 while drawing a larger circle when the magnitude of force increases.

(Method for Manufacturing the Input Module with Capacitance Sensors)

Figure 9:
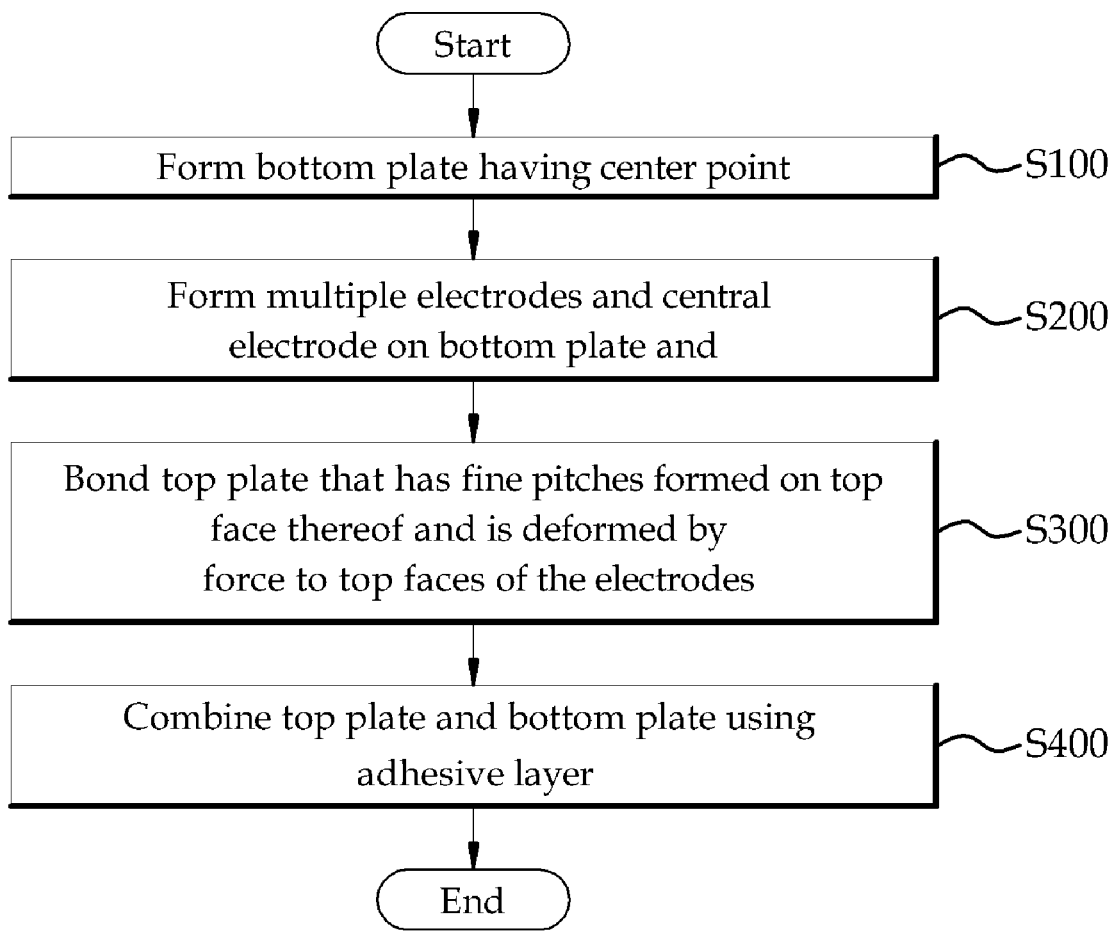
FIG. 9 is a flow chart of a method for manufacturing the input module with capacitance sensors.

A method for manufacturing the input module with capacitance sensors will now be explained with reference to the attached drawings. FIG. 9 is a flow chart illustrating the method for manufacturing the input module with capacitance sensors.

The bottom plate 100 having the center point 110 is formed in step S100, and the plurality of electrodes 200 are formed at regular intervals on the top face of the bottom plate 100. The central electrode 250 can be formed near the center point 110 of the bottom plate 100 in step S200.

The top plate 300 is bonded to the plurality of electrodes 200 and the central electrode 250 in step S300. As described above, the top plate 300 can be deformed by force applied by a finger. The top plate 300 has the fine pitches 310 formed on the top face thereof and thus the contact area of the top plate 300 and the finger increases as magnitude of force applied to the top plate increases. The edge of the top plate 300 and the edge of the bottom plate 100 are combined and fixed using the adhesive layer 400 in step S400. The inner space formed between the top plate 300 and the bottom plate 100 can be filled with the adhesive layer 400.

According to an embodiment of the present invention, the input module with the plurality of capacitance sensors can correctly measure force applied thereto by a user's finger.

The input module with the capacitance sensors has a structure simpler than that of a conventional contact resistance sensor. That is, a capacitance sensor can be easily formed using a finger, a metal plate formed inside the input module and a dielectric between the finger and the metal plate. Accordingly, a circuit configuration of the input module is also simple, and thus a compact input module with a beautiful exterior can be produced. This satisfies a consumer's demand and improves marketability.

The input module according to the present invention can be applied to portable devices such as cellular phones, PDAs, notebook computers, MP3 players and navigation systems such that users can move a cursor on displays of the portable devices easily and freely.

Furthermore, fine pitches that a user cannot watch with the naked eye are formed on the top face of the top plate of the input module to maximize a capacitance variation. This solves a problem of a conventional input module that capacitance is abruptly generated when a user touches the conventional input module with his/her finger and a capacitance variation according to magnitude of force applied to the input module is not sufficiently large and thus the magnitude of force cannot be correctly measured by forming the pitches to increase a variation in the contact area of the finger and the top face of the input module.

This structure enables manufacture of the input module at a low cost and correct measurement of magnitude of force applied to the input module. The pitches can be applied to any input module irrespective of the type and size of the input module because the pitches are microscopic. Furthermore, the input module can be manufactured using any insulator on which fine pitches can be formed, and thus the effect due to the pitches can be obtained without limiting the material of the input module.

Moreover, a plurality of capacitance sensors are arranged at specific angles based on the center point of the top plate of the input unit on the top plate on which coordinates are formed based on the center point when force is applied to the top plate of the input module, and thus a specific force vector having a magnitude of force and an angle with respect to a portion to which the force is applied can be easily calculated.

Furthermore, since a cursor can be moved on a screen pixel by pixel, a radius by which the cursor can be moved per specific unit is set based on pixel, coordinate values close to a circle having the radius are approximated and the cursor is moved to a coordinate value having an angle closest to the angle of the specific force vector such that the cursor can be smoothly moved to a direction a user desires.

In addition, the specific force vector is continuously determined for a specific unit such that the cursor can be moved making curvature when a predetermined portion of the input module is varied with force applied by a user's finger. Furthermore, the cursor can be moved to a desired direction and a cursor moving speed can be increased in proportion to the magnitude of force of the specific force vector.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for constructing an algorithm for processing a touch input applied to the input module with capacitance sensors, the input module comprising a bottom plate having a center point; a plurality of electrodes formed at regular intervals on the top face of the bottom plate and arranged apart from the center point of the bottom plate by an equal distance; a top plate bonded to the top faces of the electrodes and deformed by force applied by a pointing object; an adhesive layer formed around the top plate and the bottom plate to combine the top plate and the bottom plate; and a controller recognizing a travel distance, travel direction and moving speed of a cursor on the basis of the magnitude and angle of the force applied by the pointing object according to capacitance sensors formed by the pointing object and the electrodes when the pointing object touches the top plate, the input module including two through sixteen electrodes as the plurality of electrodes arranged at regular intervals, the method comprising the steps of:

touching a predetermined point of the top plate through the pointing object to form a plurality of capacitance sensors . . . , $A_i, A_{i+1}, \ldots, A_k, A_{k+1}, \ldots$ between the pointing object and the plurality of electrodes;

applying force to the predetermined point of the top plate with the pointing object to vary levels of capacitance of the plurality of capacitance sensors . . . , $A_i, A_{i+1}, \ldots, A_k, A_{k+1}$;

recognizing the force applied to the capacitance sensors from capacitance variations in the capacitance sensors and obtaining force vectors . . . , $F_i, F_{i+1}, \ldots, F_k, F_{k+1}, \ldots$ with respect to the plurality of capacitance sensors, which respectively have magnitudes of force, . . . , $|F_i|, |F_{i+1}|, \ldots, |F_k|, |F_{k+1}|, \ldots$ and angles . . . , $\theta_i, \theta_{i+1}, \ldots, \theta_k, \theta_{k+1}, \ldots$ to an X axis of coordinates having the X axis and a Y axis, on the coordinates based on the central point;

obtaining difference vectors . . . , $\Delta F_i, \Delta F_{i+1}, \ldots$ of the force vectors to determine a specific force vector $F_{max}$ having a magnitude of force $|F_{max}|$ and an angle $\theta_{max}$ respectively corresponding to the sum of the magnitudes of force and the sum of the angles of the force vectors with respect to the plurality of capacitance sensors; and determining the travel direction and the travel distance of the cursor using approximated coordinate values for a number of pixels, which is set using the angle $\theta_{max}$ of the specific force vector $F_{max}$, determining the moving speed of the cursor for the set number of pixels using the magnitude of force $|F_{max}|$ of the specific force vector $F_{max}$ and moving the cursor.

2. The method according to claim 1, wherein the step of determining the specific force vector $F_{max}$ comprises the steps of:

finding the force vector $F_{i+1}$ of the (i+1)th capacitance sensor $A_{i+1}$ having a largest magnitude of force among the plurality of capacitance sensors and force vectors $F_i$ and $F_{i+2}$ of the ith capacitance sensor $A_i$ and the (i+2)th capacitance sensor $A_{i+2}$ located on both sides of the (i+1)th capacitance sensor $A_{i+1}$;

selecting the force vector $F_i$ having a larger magnitude of force from the force vector $F_i$ of the ith capacitance sensor $A_i$ and the force vector $F_{i+2}$ of the (i+2)th capacitance sensor $A_{i+2}$;

finding the force vector $F_k$ of the kth capacitance sensor $A_k$ that is symmetrical with respect to the origin for the ith capacitance sensor $A_i$ and the force vector $F_{k+2}$ of the (k+2)th capacitance sensor $A_{k+2}$ that is symmetrical with respect to the origin for the (i+2)th capacitance sensor $A_{i+2}$ and determining the difference vector $\Delta F_i$ of the force vectors $F_i$ and $F_k$ and the difference vector $\Delta F_{i+2}$ of the force vectors $F_{i+2}$ and $F_{k+2}$; and determining the specific force vector $F_{max}$ having the magnitude of force $|F_{max}|$ and an angle $\theta_{max}$, which respectively correspond to the sum of magnitudes of force and angles of the difference vectors $\Delta F_i$ and $\Delta F_{i+2}$.

3. The method according to claim 2, wherein when at least one of the plurality of capacitance sensors senses impulse force, a cursor executes a click function.

4. The method according to claim 2, wherein when force is applied by the pointing object to the center of the top plate, a click sensor recognizes the force as click and opens or closes a file corresponding to the point at which the cursor is located and, when the capacitance sensors sense force after the click sensor recognizes the click, a scroll function is executed along the travel direction of the cursor according to the specific force vector.

5. The method according to claim 1, wherein in the step of moving the cursor, pixel-based coordinates having the point at which the cursor is currently located as the origin (0, 0) and X and Y axes and, when a radius R from the origin corresponds to a predetermined number of pixels, coordinate values that determine the travel direction and the travel distance of the cursor and are close to a circle having the radius are approximated, and the cursor is moved to a specific coordinate value having an angle to the X axis clockwise, which is closest to the angle $\theta_{max}$ of the specific force vector $F_{max}$, among the coordinate values.

6. The method according to claim 5, wherein when the radius R corresponds to two pixels, the coordinate values are approximated to (2, 0), (2, 1), (2, 2), (1, 2), (0, 2), (−1, 2), (−2, 2), (−2, 1), (−2, 0), (−2, −1), (−2, −2), (−1, −2), (0, −2), (1, −2), (2, −2) and (2, −1) and the cursor is moved to a specific coordinate value having an angle to the X axis clockwise, which is closest to the angle $\theta_{max}$ of the specific force vector $F_{max}$, among the coordinate values.

7. The method according to claim 5, wherein when the radius R corresponds to four pixels, the coordinate values are approximated to (4, 0), (4, 1), (4, 2), (4, 3), (3, 3), (3, 4), (2, 4), (1, 4), (0, 4), (−1, 4), (−2, 4), (−3, 4), (−3, 3), (−4, 3), (−4, 2), (−4, 1), (−4, 0), (−4, −1), (−4, −2), (−4, −3), (−3, −3), (−3, −4), (−2, −4), (−1, −4), (0, −4), (1, −4), (2, −4), (3, −4), (3, −3), (4, −3), (4, −2) and (4, −1) and the cursor is moved to a specific coordinate value having an angle to the X axis clockwise, which is closest to the angle $\theta_{max}$ of the specific force vector $F_{max}$, among the coordinate values.

8. The method according to claim 5, wherein the moving speed of the cursor for the predetermined number of pixels is proportional to the magnitude of force of the specific force vector $F_{max}$.

9. The method according to claim 1, further comprising the step of continuously calculating the specific force vector when force is applied to a predetermined portion of the top plate of the input module, determining the travel direction of the cursor using the approximated coordinate values according to the angle of the specific force vector and determining the moving speed for the predetermined number of pixels according to the magnitude of force of the specific force vector after the step of moving the cursor.

* * * * *